United States Patent [19]

Minakuchi

[11] Patent Number: 5,793,036
[45] Date of Patent: Aug. 11, 1998

US005793036A

[54] SYNCHRONIZING SIGNAL GENERATING CIRCUIT FOR OPTICAL SCANNING DEVICE

[75] Inventor: Tadashi Minakuchi, Tokyo, Japan

[73] Assignee: Asahi Kogaku Kogyo Kabushiki Kaisha, Tokyo, Japan

[21] Appl. No.: 721,716

[22] Filed: Sep. 27, 1996

[30] Foreign Application Priority Data

Sep. 29, 1995 [JP] Japan .................. 7-274979

[51] Int. Cl.$^6$ .......................................... H01J 3/14
[52] U.S. Cl. ............................. 250/234; 358/481
[58] Field of Search .......................... 250/234–236; 358/474, 481, 492, 493; 359/216

[56] References Cited

U.S. PATENT DOCUMENTS

| | | |
|---|---|---|
| 4,663,523 | 5/1987 | Swanberg . |
| 5,001,341 | 3/1991 | Negishi . |
| 5,084,616 | 1/1992 | Morimoto . |
| 5,087,813 | 2/1992 | Negishi .................. 358/481 |
| 5,138,479 | 8/1992 | Ando ...................... 359/216 |

FOREIGN PATENT DOCUMENTS 54-82248  6/1979  Japan .

*Primary Examiner*—Stephone B. Allen
*Attorney, Agent, or Firm*—Greenblum & Bernstein P.L.C.

[57] ABSTRACT

A synchronizing signal generating circuit for an optical scanning device. The synchronizing signal gernerating circuit including a photodiode, a high-pass filter circuit, and a signal processing circuit. The high-pass filter circuit is the load for the photodiode and is comprised of an inductance and a resistance arranged in parallel. The high-pass filter circuit is configured to have a cutoff frequency that is marginally below the frequency of a synchronizing signal. The signal processing circuit is connected to the connection point of the photodiode and the high-pass filter circuit and receives a detection signal. The signal processing circuit amplifies the detection signal, cuts the DC component, and compares the resulting signal to a reference voltage to produce the synchronizing signal.

6 Claims, 6 Drawing Sheets

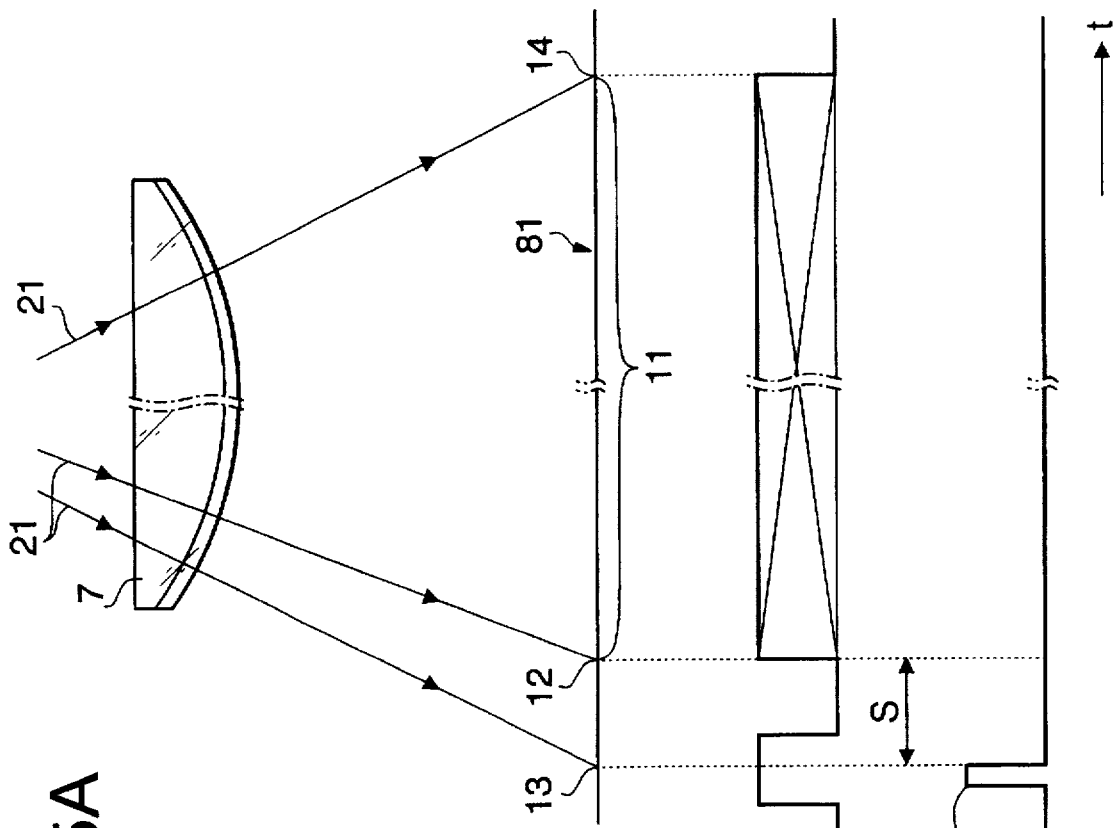

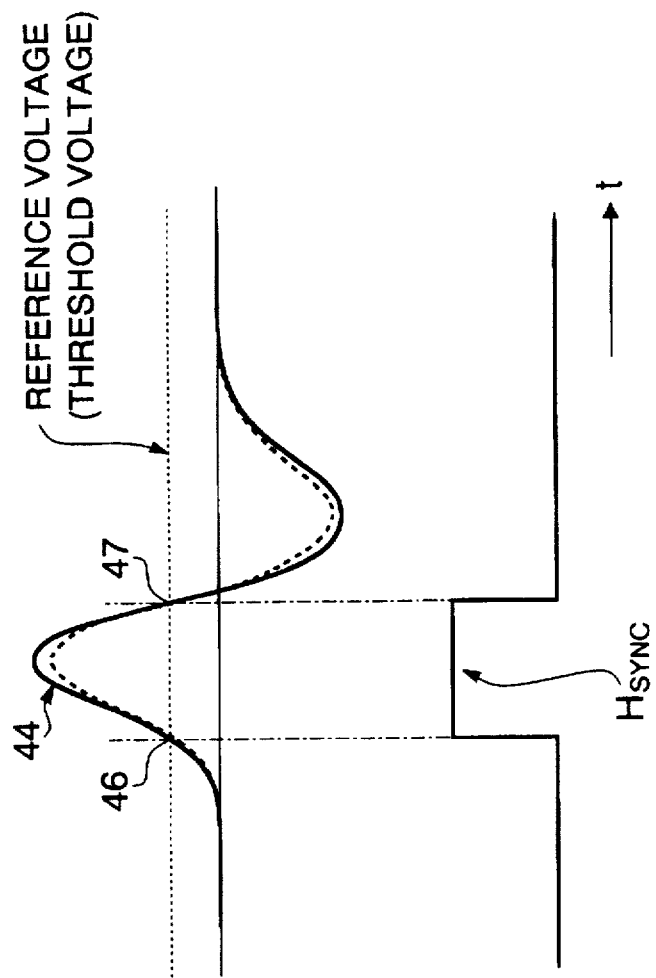
FIG. 6A OUTPUT SIGNAL FROM PHOTODIODE
FIG. 6B INPUT TO COMPARATOR
FIG. 6C SYNCHRONIZING SIGNAL

1

SYNCHRONIZING SIGNAL GENERATING CIRCUIT FOR OPTICAL SCANNING DEVICE

BACKGROUND OF THE INVENTION

The present invention relates to a synchronizing signal generating circuit used in an optical scanning device. Optical scanning devices are typically included in laser beam printers, facsimile devices, or the like.

In a conventional optical scanning device, a laser beam is emitted from a light source (for example, a laser diode) and is deflected and scanned in a predetermined angular range (deflection angle) and direction by a rotating polygonal mirror. The laser beam passes through an fθ lens that causes the laser beam to scan at a constant speed along a scan path in a predetermined scan plane. The movement of the laser beam through the deflection angle in the scan plane is referred to as a main scan.

If the optical scanning device is used in, for example, a conventional laser beam printer, a photoconductive surface (light receiving surface) of a rotatable photoconductive drum is positioned in the scan plane. Thus, during each main scan, the laser beam passes along the photoconductive surface. The photoconductive surface is parallel to the rotational axis of the photoconductive drum and is uniformly charged. In a predetermined image area on the photoconductive surface, the laser beam is optically modulated at the light source (i.e. turned ON and OFF) according to image data that is received from an external source, such as a personal computer. When the laser beam hits the uniformly charged photoconductive surface, it forms an electrostatic latent image, corresponding to the image data received, on the photoconductive surface.

The laser beam printer's photoconductive drum is controlled to rotate in synchronization with the main scanning operation. The rotation of the photoconductive drum is referred to as a sub-scan. As the photoconductive drum is rotated, the electrostatic latent image attracts and holds toner on the photoconductive surface in a pattern corresponding to the electrostatic latent image. Then, as the photoconductive drum is further rotated, the toner image is transferred to and fixed on a recording sheet.

The image area is delineated by an image start position and an image end position that are located near opposite ends of the photoconductive drum. A synchronizing signal $H_{SYNC}$ (horizontal synchronizing signal) is used to synchronize the image start position so that it is the same for each main scan. That is, the synchronizing signal $H_{SYNC}$ synchronizes the position at which the image data transfer starts, and thus, synchronizes the position on the recording paper at which the toner image transfer starts. It is important that the image start position remain consistent for each main scan in order to produce accurate printing.

In a conventional optical scanning device, a photodiode is positioned at a synchronizing position that is on the main scan path but outside the image area at a predetermined distance from the image start position. The laser beam is turned ON while passing over the synchronizing position such that the photodiode outputs a signal. The synchronizing signal $H_{SYNC}$ is generated based on the signal output from the photodiode and the start position for the image area is that position reached by the laser beam a predetermined amount of time after the synchronizing signal $H_{SYNC}$.

FIG. 1 shows a conventional synchronizing signal generating circuit 10a for generating the synchronizing signal $H_{SYNC}$. The conventional synchronizing signal generating circuit 10a includes a photodiode 6, a resistor 41 (the load circuit for the photodiode 6), an amplifier 35, a comparator 38, and a reference voltage generator 39.

FIGS. 2A and 2B show timing charts for the output of the photodiode 6 (FIG. 2A) and the conventional synchronizing signal generating circuit 10a (FIG. 2B).

When the laser beam illuminates the photodiode 6, a photodiode current of a magnitude corresponding to the intensity of light received is output from the photodiode 6. The photodiode current creates a photodiode voltage across the load circuit (the resistor 41). The photodiode voltage is amplified by the amplifier 35, and an amplified photodiode voltage signal (FIG. 2A) is then input into the comparator 38. In the comparator 38, the amplified photodiode voltage is compared with a reference voltage (threshold voltage) that is output from the reference voltage generator 39. The comparator 38 outputs a rectangular-shaped synchronizing signal $H_{SYNC}$, which rises at a first intersection point 42 and falls at a second intersection point 43 between the reference voltage and the amplified photodiode voltage. The trailing edge of the synchronizing signal $H_{SYNC}$ is used to synchronize the image start position, as explained above.

However, a problem with the conventional synchronizing signal generating circuit 10a is that the signal output from the photodiode 6 fluctuates due to two factors. Firstly, fluctuations in the intensity of received light are caused by, for example, fluctuations in the laser beam output, and imperfections in the surface of the polygonal mirror. Secondly, signal problems occur, such as, for example, extra signal components (noise), offset voltage and the like. Thus, as shown in FIG. 2B, the pulse width of the synchronizing signal $H_{SYNC}$, and in particular, the timing of the leading edge and the trailing edge of the synchronizing signal $H_{SYNC}$, fluctuate. This reduces the accuracy of the synchronizing signal $H_{SYNC}$.

Variations in the timing of the synchronizing signal $H_{SYNC}$ cause the image start position to vary, and thus, lower the plotting (printing) quality.

SUMMARY OF THE INVENTION

It is therefore an object of the present invention to provide an improved synchronizing signal generating circuit which enables the generation of a high accuracy synchronizing signal.

The synchronizing signal generating circuit according to the invention is provided in an optical scanning device. The optical scanning device includes a scanning light beam that scans in a predetermined direction through a predetermined angle along a scan path.

In one preferred embodiment, the synchronizing signal generating circuit includes a light receiving element (in a particular case, a photodiode), a high-pass filter circuit, and a signal processing circuit.

The light receiving element is responsive to light received from the scanning light beam, such that when the scanning light beam contacts the light receiving element, the light receiving element generates a light receiving element signal.

The high-pass filter circuit is connected to the light receiving element and has a predetermined cutoff frequency to only allow high frequency components of the light receiving element signal to pass.

The signal processing circuit is responsive to an output signal (detection signal) from a circuit containing the light receiving element and the high-pass filter circuit. In response to the detection signal, the signal processing circuit generates a square-wave synchronizing signal indicating that the scanning light beam has reached a predetermined position along the scanning path.

Thus, the high-pass filter circuit is used as the load circuit for the light receiving element and the detection signal is generated from the high frequency components of the light receiving element signal. Since these components of the light receiving element signal vary little due to fluctuations in the light receiving element signal (i.e. fluctuations due to fluctuations in the laser beam output or the like), the detection signal also varies little due to these fluctuations and is used for accurate generation of the synchronizing signal.

Preferably, the predetermined cutoff frequency of the high-pass filter is set marginally below the frequency of the synchronizing signal in order to accurately isolate the particular high frequency components needed to generate the synchronizing signal accurately.

In a particular case, the high-pass filter circuit includes at least two of any of a resistor, a capacitor, and an inductor, connected in parallel. This type of simple oscillating circuit allows easy and inexpensive circuit design.

Preferably, at least one alternating-current coupling (AC coupling) is included in a signal transmission path of the signal processing circuit. By using an AC coupling, the DC component of the circuit is cut and the generation of the synchronizing signal is even more accurate.

In a further particular case, the signal processing circuit generates the synchronizing signal upon comparing the amplitude of the detection signal with a predetermined reference value. Using a reference value (for example, a reference voltage) cuts noise from the detection signal to produce an accurate synchronizing signal.

As has been described above, in a synchronizing signal generating circuit for an optical scanning device according to the invention, the accuracy of the generation of the synchronizing signal is improved by the high-pass filter circuit. The effects of fluctuations in the output of the light receiving element are reduced to enable the accurate generation of the synchronizing signal. Further, in the case where the synchronizing signal generating circuit is applied to an optical scanning device in a laser beam printer, instabilities in the image start position can be prevented to give very accurate plotting (printing) quality.

BRIEF DESCRIPTION OF THE DRAWINGS

FIGS. 5A, 5B and 5C are, respectively, a schematic view and two timing charts showing the relationship between the scanning of the laser beam and the generation of the synchronizing signal;

FIGS. 6A, 6B and 6C are timing charts showing the operation of the synchronizing signal generating circuit according to the invention.

DETAILED DESCRIPTION OF THE PREFERRED EMBODIMENTS

Figure 1:
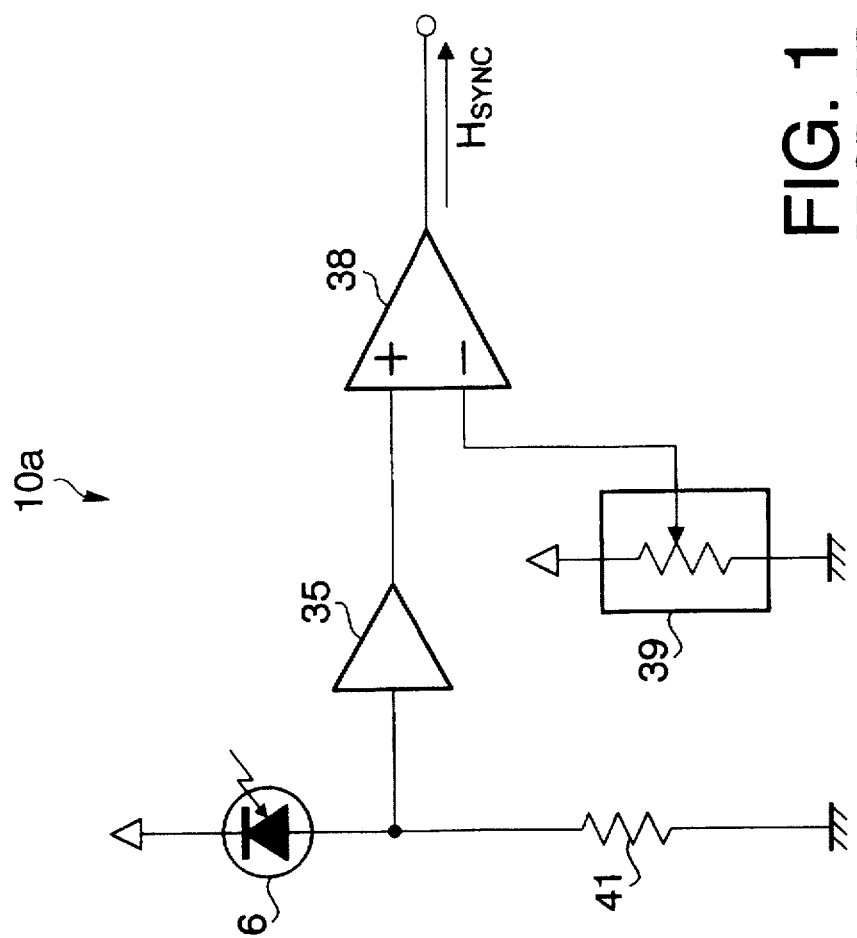
FIG. 1 is a circuit diagram of a conventional synchronizing signal generating circuit for an optical scanning device.
Figure 2:
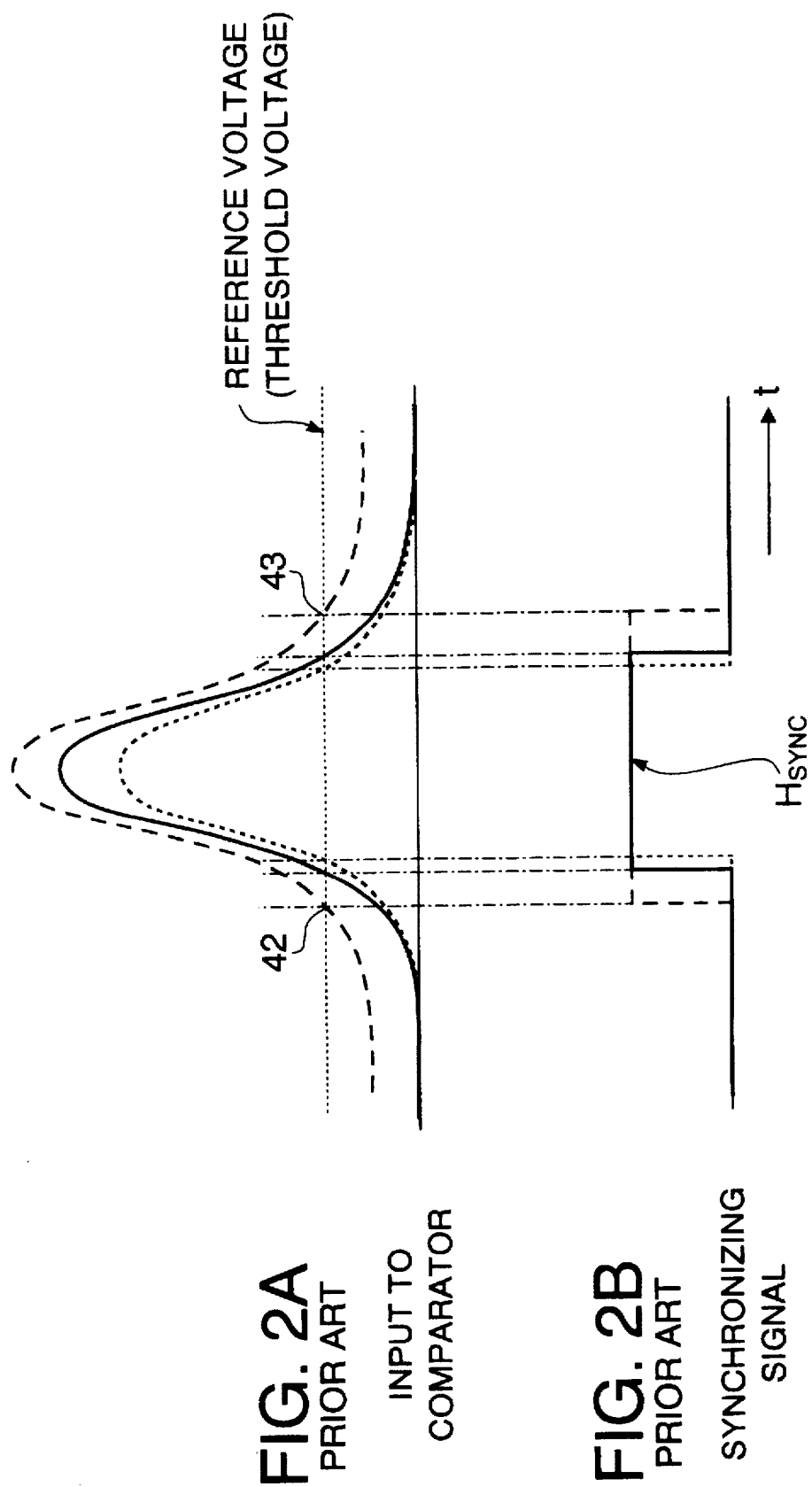
FIGS. 2A and 2B are timing charts showing the operation of a conventional synchronizing signal generating circuit for an optical scanning device.
Figure 3:
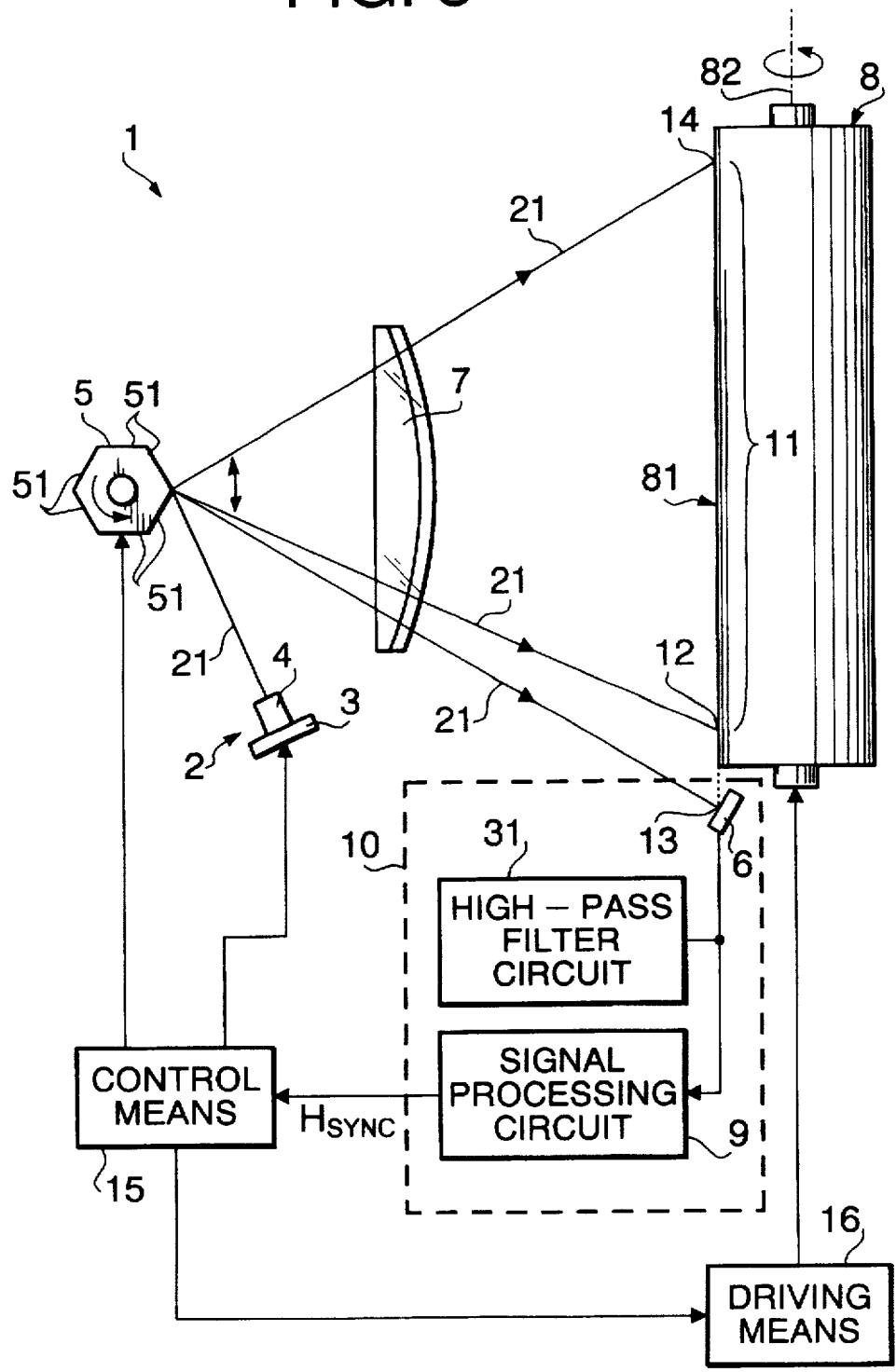
FIG. 3 is a plan view of an embodiment of a synchronizing signal generating circuit for an optical scanning device according to the invention as applied to a laser printer.

FIG. 3 is a plan view of an embodiment of a synchronizing signal generating circuit according to the present invention, as applied to a laser printer.

As shown in FIG. 3, an optical scanning device 1 includes a light source 2, a polygonal mirror 5, an fθ lens 7, a scanning plane (in this case a photoconductive drum 8), and a synchronizing signal generating circuit 10.

The light source 2 includes a laser light source 3, such as, for example a semiconductor laser, and an optical system 4. The laser light source 3 generates a laser beam 21. The optical system 4, for example, a collimating lens and a condenser lens (not shown), is mounted at the light emitting side of the laser light source 3 so that the laser beam 21 is converged onto a reflecting surface 51 of the polygonal mirror 5.

The polygonal mirror 5, which is rotatable, is formed as a regular polygon, and has, for example, six reflecting surfaces 51 formed on its outer periphery. Each reflecting surface 51 is a flat reflecting surface, for example, a vapor-deposited aluminum layer, formed at a predetermined angle (in this example, 120∞) with respect to an adjacent reflecting surface 51.

The optical scanning device 1 further includes a control circuit 15 (control means), such as a microcomputer, or the like, and a driving unit 16 (driving means), such as a motor and gear system. The control circuit 15 controls the rotation of the polygonal mirror 5 and the driving unit 16.

As shown in FIG. 3, the laser beam 21 from the light source 2 is reflected by the reflecting surfaces 51 of the polygonal mirror 5. The polygonal mirror 5 is rotated by a motor (not shown) such that, due to the rotation of the polygonal mirror 5 (in this case counter-clockwise and at a constant speed), the angle of incidence of the laser beam 21 on the reflecting surface 51 changes and the laser beam 21 is deflected and scanned within a predetermined angular range. The angular range through which the laser beam 21 is scanned is referred to as the deflection angle.

The fθ lens 7 is placed such that it covers the deflection angle and acts on the laser beam 21 so that the angular scanning velocity that the laser beam 21 has when it is reflected by the polygonal mirror 5 is converted to a constant horizontal scanning velocity on a uniformly charged photoconductive surface 81 (light receiving surface) of the photoconductive drum 8. The fθ lens 7 also compensates for any tilting of the reflecting surfaces 51 of the polygonal mirror 5.

After passing through the fθ lens 7, the laser beam 21 contacts the photoconductive surface 81 on the circumference of the photoconductive drum 8 and scans at a constant horizontal velocity. For each rotation of the polygonal mirror 5 by 60∞, the laser beam 21 is deflected once through the deflection angle and is thus scanned (main scanned) once along the photoconductive surface 81, parallel to a rotation axis 82 of the photoconductive drum 8. During a predetermined part of each main scan, the control circuit 15 controls the laser light source 3 to turn the laser beam 21 ON and OFF in response to image data received from an external source (not shown), such as a personal computer. Thus, during each main scan, an electrostatic latent image (corresponding to the image data) is formed at the points of contact (referred to as dots) between the laser beam 21 and the circumference of the photoconductive drum 8.

For each main scan, a sub-scan is also performed by rotating the photoconductive drum 8 by a predetermined amount in a predetermined direction. The control circuit 15 instructs the driving unit 16 to rotate the photoconductive drum 8 by an amount equal to the size of the contact made by the laser beam 21 on the photoconductive surface 81, that is, one dot.

Thus, each time the polygonal mirror 5 rotates by 60∞, both a main scan and a sub scan are performed and one full rotation of the polygonal mirror 5 results in six main scans and six sub scans that correspond to the plotting of six dots in the sub scan direction.

As the photoconductive drum 8 rotates, toner (not shown) is applied to the photoconductive surface 81 and adheres in correspondence to the electrostatic latent image, creating a toner image. The toner image is then transferred to and fixed on recording paper (not shown).

Also, as shown in FIG. 3, the deflection angle covers a synchronizing position 13 and an image area 11 located on the scan plane. The synchronizing position 13 is beside the image area 11 at the start of the main scan path. The image area 11 is on the photoconductive surface 81 of the photoconductive drum 8 and includes an image start position 12, and an image end position 14 at opposite ends of the photoconductive drum 8. The image start position 12 is the predetermined position at which the optical modulation of the laser light source 3 based on the image data starts. The image end position 14 is the position at which the optical modulation of the laser light source 3 based on the image data ends. The synchronizing position 13 is located a predetermined distance from the image start position 12.

It is important that the image start position 12 be consistent in the sub scan direction in order to produce accurate printing. In order to keep the image start position 12 consistent, the synchronizing signal generating circuit 10 generates a synchronizing signal $H_{SYNC}$ (horizontal synchronizing signal) that determines the image start position 12 for each main scan.

The synchronizing signal generating circuit 10 includes a photodiode 6, a high-pass filter circuit 31, and a signal processing circuit 9. The photodiode 6 is connected to the high-pass filter circuit 31 and the signal processing circuit 9. The signal processing circuit 9 is also connected to the control circuit 15.

The photodiode 6 is disposed in the scanning path of the laser beam 21 at the synchronizing position 13 such that, upon illumination of the photodiode 6 by the laser beam 21, the photodiode 6 and high-pass filter circuit 31 output a detection signal to the signal processing circuit 9, which then outputs the synchronizing signal $H_{SYNC}$. Since the laser beam 21 scans at a constant horizontal velocity, the image start position 12 is the position reached after the passage of a predetermined amount of time from the detection of the synchronizing signal $H_{SYNC}$.

Figure 4:
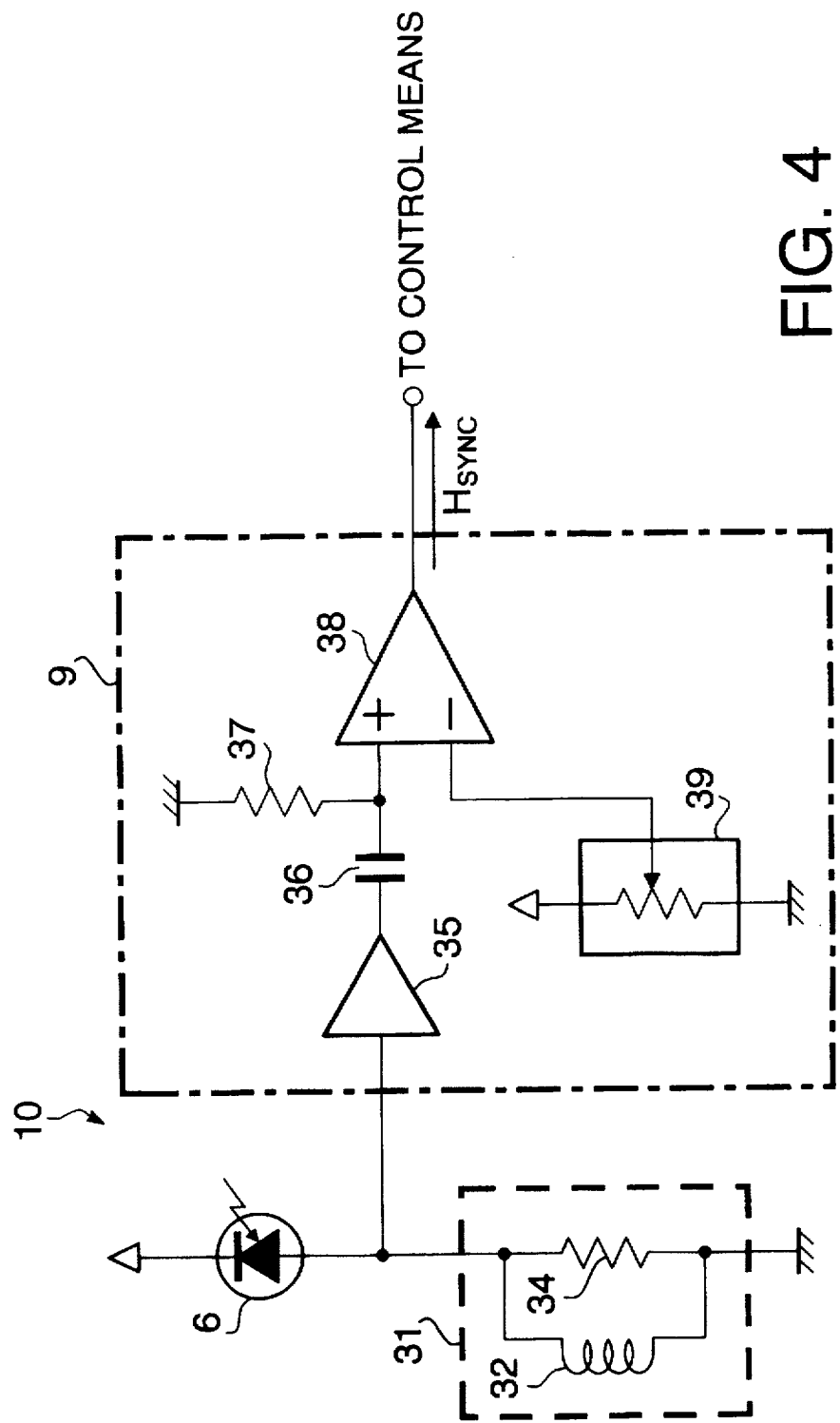
FIG. 4 is a circuit diagram of the synchronizing signal generating circuit for an optical scanning device according to the invention.

FIG. 4 is a circuit diagram of the synchronizing signal generating circuit 10 showing a detailed example of the high-pass filter circuit 31 and the signal processing circuit 9.

As shown in FIG. 4, the high-pass filter circuit 31 is formed by connecting an inductor 32 (for example an inductance coil) and a resistor 34 (for example, a resistor) in parallel.

The signal processing circuit 9 is connected to a connection point of the photodiode 6 and the high-pass filter circuit 31. The signal processing circuit 9 includes an amplifier 35, a capacitor 36, a grounded resistor 37, a comparator 38, and a variable reference voltage generator 39.

The detection signal (from the circuit including the photodiode 6 and the high-pass filter circuit 31) is amplified by the amplifier 35 and sent to the capacitor (coupling capacitor) 36 to cut (eliminate) DC components. The capacitor 36 is connected to a positive input terminal of the comparator 38. Thus, the signal transmission from the amplifier 35 to the comparator 38 takes the form of an AC signal. The grounded resistor 37 is connected between the capacitor 36 and the positive input terminal of the comparator 38. A negative input terminal of the comparator 38 is connected to the variable reference voltage generator 39. A predetermined reference voltage (threshold voltage) is set for the reference voltage generator 39.

FIGS. 6A, 6B and 6C are timing charts which show the operation of the synchronizing signal generating circuit 10.

When the laser beam 21 is incident on the photodiode 6, a current, with a magnitude corresponding to the intensity of light received, flows through the photodiode. Thus, a photodiode signal (for example signal 26 shown in FIG. 6A) is output from the photodiode 6.

In the design of the high-pass filter circuit 31, the respective values of the inductance 32 and the resistance 34 of the high-pass filter circuit 31 are set to predetermined values based on a typical response waveform output by the photodiode 6, so as to allow only the high frequency component of the signal output from the photodiode 6 to pass and optimize the generation of the synchronizing signal $H_{SYNC}$. In particular, a cutoff frequency f1 of the high-pass filter is set to a predetermined value that is close to, but lower than, the frequency of the synchronizing signal $H_{SYNC}$. That is, the cutoff frequency f1 is set to exclude frequencies below that of the synchronizing signal $H_{SYNC}$.

Thus, when a signal of a frequency greater than the cutoff frequency f1 of the high-pass filter circuit 31 is output from the photodiode 6, only the frequencies above the cutoff frequency f1 pass, producing a modified signal (detection signal) at the connection between the photodiode 6 and the high-pass filter circuit 31.

The detection signal is amplified by the amplifier 35 and then Cut of its DC components by the capacitor 36, producing a waveform such as that shown in FIG. 6B at the positive input terminal of the comparator 38.

The use of at least one AC coupling in the signal transmission path cuts the DC component of the circuit such that the generation of the synchronizing signal is even more accurate.

The reference voltage is set to a predetermined value which is sufficiently small when compared with the peak value of a high-pass filter waveform 44 to ensure the intersection with the high-pass filter waveform 44 for generation of the synchronizing signal $H_{SYNC}$.

Even if there are fluctuations in the photodiode signal due to fluctuations in the amount of light received (that is, for example, variations of the photodiode signal such as those shown as waveforms 25 and 27), the maximum of the photodiode signal will occur consistently as the laser beam passes the center of the light receiving area of the photodiode 6 and the high frequency component of the photodiode signal will remain consistent. Thus, the use of the high-pass filter circuit 31 cuts signal components that are below the cutoff frequency (including DC components) and ensures that the signal at the positive input terminal of the comparator 38 will remain substantially the same as shown in FIG. 6B. In particular, the intersection points 46 and 47 of the signal at the positive input terminal of the comparator 38 with the reference voltage will remain substantially the same for each photodiode signal pulse.

The comparator 38 compares the inputs and a HIGH level signal is output during the interval in which the signal voltage (positive terminal) is greater than the reference voltage. That is, as shown in FIG. 6C, a rectangular synchronizing signal $H_{SYNC}$, which rises at intersection point 46 and falls at intersection point 47, is generated by the comparator 38. The synchronizing signal $H_{SYNC}$ is output from the comparator 38 and input into the control circuit 15.

In the present embodiment, since the intersection points 46 and 47 are substantially the same for each photodiode signal pulse, the generation of the synchronizing signal $H_{SYNC}$, and in particular, the generation of the leading edge and the trailing edge of the synchronizing signal $H_{SYNC}$ will remain consistent so that the synchronizing signal $H_{SYNC}$ is highly accurate. This allows the image start position 12 to remain consistent for each main scan, allowing accurate printing.

FIG. 5A shows a schematic view of the scan path of the laser beam 21 across the photoconductive surface 81. FIGS. 5B and 5C are timing charts showing the relationship between the lighting of the laser light source 3 and the generation of the synchronizing signal $H_{SYNC}$.

At the beginning of a main scan, the laser light source 3 is lit for a predetermined time. The predetermined time starts before and ends after the time at which the laser beam 21 passes over the synchronizing position 13 (photodiode 6). The predetermined time is determined, for example, based on the detection of the scan end position 14 for the previous main scan.

The photodiode 6 is thus activated by the laser beam 21 and the synchronizing signal $H_{SYNC}$ is output from the signal processing circuit 9. The synchronizing signal $H_{SYNC}$ is then input into the control circuit 15.

In this embodiment, the trailing edge of the synchronizing signal $H_{SYNC}$ is used by the control circuit 15 to calculate the starting position for the transfer of data by the laser beam 21, that is, the image start position 12.

A predetermined time S, required for the laser beam 21 to scan, in the main scanning direction, between the synchronizing position 13 and the image start position 12, is set in a timer (not shown) built into control circuit 15. The timer is started when the synchronizing signal $H_{SYNC}$ is detected, that is, at the time of the trailing edge of the synchronizing signal $H_{SYNC}$, and, when the time set in the timer elapses, the laser beam 21 is at the image start position 12.

Thereafter, while main scanning continues, the laser light source 3 is modulated in accordance with the image data (not shown). The laser beam 21 scans over the image area 11, thereby forming the desired electrostatic latent image on the photoconductive surface 81.

When the polygonal mirror 5 has turned through a predetermined angle, in this case 60 degrees, the scan end position 14 is reached, the laser light source 3 is turned OFF, and the next main scan begins.

During the predetermined time S, the control circuit 15 also performs a sub scan by controlling the driving unit 16 to rotate the photoconductive drum 8 by an amount corresponding to one dot.

The synchronizing signal generating circuit according to the invention can be applied to various optical scanning devices, including those used for recording (writing) purposes such as laser beam printers or laser photo printers and those used for reading purposes such as bar code readers, image readers, and the like. Thus, the synchronizing signal generating circuit according to the invention provides a compact, inexpensive means to improve printing and reading accuracy in a variety of devices.

Although the structure and operation of a synchronizing signal generating circuit according to the invention has been described herein with respect to the preferred embodiment, many modifications and changes can be made without departing from the spirit and scope of the invention.

The present disclosure relates to subject matter contained in Japanese Patent Application No. HEI 07-274979, filed on Sep. 29, 1995, which is expressly incorporated herein by reference in its entirety.

What is claimed is:

1. A synchronizing signal generating circuit provided in an optical scanning device, said optical scanning device including a scanning light beam that scans in a predetermined direction through a predetermined angle along a scanning path, said synchronizing signal generating circuit comprising:

a light receiving element that, responsive to light received from said scanning light beam, generates a light receiving element signal;

a high-pass filter circuit, connected to said light receiving element, said high-pass filter circuit having a predetermined cutoff frequency to allow only a predetermined high frequency component of said light receiving element signal to pass; and a signal processing circuit, responsive to a detection signal output from a circuit containing said light receiving element and said high-pass filter circuit, that generates a square-wave synchronizing signal indicating that said scanning light beam has reached a predetermined position along said scanning path.

2. The synchronizing signal generating circuit according to claim 1, said predetermined cutoff frequency being marginally below a frequency of said synchronizing signal.

3. The synchronizing signal generating circuit according to claim 1, wherein said light receiving element comprises a photodiode.

4. The synchronizing signal generating circuit according to claim 1, wherein said high-pass filter circuit comprises a circuit arranged by connecting at least two of a resistor, a capacitor and an inductor, in parallel.

5. The synchronizing signal generating circuit according to claim 1, wherein at least one alternating-current coupling is included in a signal transmission path of said signal processing circuit.

6. The synchronizing signal generating circuit according to claim 1, wherein said signal processing circuit generates said synchronizing signal upon comparing an amplitude of said detection signal with a predetermined reference value.

* * * * *